United States Patent Office 3,086,872
Patented Apr. 23, 1963

3,086,872
DYE COMPOSITIONS FOR HECTOGRAPHIC DUPLICATION
Roy C. Locke, Salem, N.J., assignor to E. I. du Pont de Nemours and Company, Wilmington, Del., a corporation of Delaware
No Drawing. Filed Jan. 18, 1960, Ser. No. 2,839
6 Claims. (Cl. 106—22)

This invention relates to a novel dye composition and more particularly to a dye composition which is useful in hectograph printing processes.

In the spirit duplicating system, an image is first formed in reverse on a master copy by transfer from a carbon type sheet coated with a large amount of a water-soluble dye such as crystal violet. In lieu of a carbon type sheet coated with the dye, a hectograph typewriter ribbon may be used with special techniques to imprint a heavy reverse image onto the master. The image is then transferred from the master to copy sheets by wetting the copy sheets with a duplicating fluid which comprises alcohols or mixtures of water and alcohols and then contacting the master for a fraction of a second with the wetted copy paper. This contact between master and copy paper is usually made with the well-known rotary duplicating machines and in this way a portion of the dye on the master is taken up by the wet copy paper. Many copies can be made easily and quickly by repeating the contact between master and wetted copy papers.

Hectograph systems of this type are highly desirable because of their flexibility, economy and simplicity, but there are serious objections to their use. First of all, the requirement that the dyes be highly soluble in spirit solvents (e.g. alcohol) has limited the selection of dyes to such compositions as crystal violet, rhodamine (red), Victoria Blue, Victoria Green, and a few formulations of these dyes with related compounds to form blacks. These dyes have a serious deficiency in light-fastness and the copy produced with them loses intelligence gradually upon exposure to light. Another disadvantage to these dyes is the difficulty of handling the master and copy sheets without staining the hands and clothing; in fact, clean handling is almost impossible.

It is an object of the present invention to provide novel dye compositions. A further object is to provide dye compositions which are useful in hectograph duplication processes. A still further object is to provide an improvement in the process of hectograph duplication by using the novel dye compositions. Other objects will appear hereinafter.

These and other objects of this invention are accomplished by a hectograph dye composition comprising (1) a carrier selected from the group consisting of a wax-oil combination and an oil, and (2) an alcohol soluble dye, said dye being a metal complex of an o,o'-dihydroxy azo dye wherein the metal is selected from the group consisting of chromium and cobalt.

The novel compositions of this invention which are useful for hectograph duplication may be conveniently made by forming an intimate mixture of the dye with the carrier. In the instance where a wax-oil combination is used as the carrier, it is necessary to melt the wax before the dye is added. The dye composition is then ground to produce a uniform paste-like mass in which the dye particles are intimately dispersed. The dye composition should flow readily at temperatures of about 125° F. to about 220° F. and as a result may be conveniently used to coat paper to make the carbon sheets for the hectograph process. A similar procedure may be employed to make hectograph typewriter ribbon inks except that in this instance the carrier used should be of the liquid type.

The novel dye compositions of this invention are similar to the hectograph dye compositions which have been previously used except that a chromium or cobalt complex of an o,o-dihydroxy azo dye is used in place of the conventional dyes. The use of this metal complex imparts the highly desirable properties to the novel composition of this invention. The present invention does not contemplate the use of salts, obtained by reacting the metal complexes which contain sulfonic acid groups with organic bases such as diarylguanidines, as the dye component in the novel compositions. Salts reduce the color content of the dye due to the relatively high molecular weight of the salt component.

The chromium or cobalt complexes of o,o'-dihydroxy azo dyes are compounds which are well-known in the art. The o,o'-dihydroxy azo dyes used to provide the metal complexes of this invention correspond to the general formula

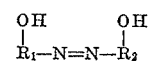

where $R_1$ is an aromatic radical of the benzene and naphthalene series which radicals may be substituted with chlorine, bromine, nitro, alkyl, alkoxy, sulfonic acid or sulfamoyl groups, and $R_2$ is a radical of a coupling component selected from the class of benzene, naphthalene, heterocyclic and acetoacetarylide series. The two hydroxy groups are in ortho positions relative to the azo group. The coupling component may be a hydroxybenzene, a hydroxynaphthalene, an acetanilide, a pyrazolone, a hydroxyl quinoline, a hydroxyisoquinoline and the like and these components may also be substituted with groups such as hydroxyl, alkyl, alkoxy, chlorine, bromine, sulfonic acid, sulfamoyl, acylamino and the like. The preparation of these o,o'-dihydroxy azo dyes is well known in the art.

The chromium or cobalt complexes of these o,o'-dihydroxy azo dyes may be obtained by well-known procedures. In general, the mole ratio of the metal to the dye should range from about 1:1 to 1:2. Some representative examples of dyes falling within the broad class of chromium and cobalt complexes of o,o'dihydroxy azo dyes operable in this invention are shown in the following table:

TABLE I

| | Diazotized amine | Coupled with— | Metallized with— | Mole ratio of metal to dye |
|---|---|---|---|---|
| A | 1-amino-6-nitro-2-naphthol-4-sulfonic acid. | 2-naphthol | Cr | 1:1.5 |
| B | 1-amino-2-naphthol-4-sulfonic acid. | ----do---- | Cr | 1:1.5 |
| C | 2-amino-1-phenol-4-sulfonamide. | 3-methyl-1-(m-sulfamoylphenyl)-5-pyrazolone. | Cr | 1:2 |
| D | 6-amino-4-nitro-1-phenol-2-sulfonic acid. | Acetoacetanilide | Cr | 1:1 |
| E | 2-amino-1-phenol-4-sulfonamide. | 2-naphthol | Cr | 1:2 |
| F | 2-amino-chloro-1-phenol-6-sulfonic acid. | 1,3-isoquinolinediol | Cr | 1:1 |
| G | 1-amino-2-naphthol-4-sulfonic acid. | 1-naphthol-8-sulfonic acid. | Cr | 1:1 |
| H | 2-amino-1-phenol-4-sulfonamide. | Acetoacetanilide | Co | 1:2 |
| I | ----do---- | 3-methyl-1-phenyl-5-pyrazolone. | Co | 1:2 |
| J | 2-amino-4-nitrophenol | 2-naphthol | Cr | 1:2 |
| K | 2-amino-1-phenol-4-sulfonamide. | ----do---- | Co | 1:2 |
| L | ----do---- | 1,3-isoquinolinediol | Cr | 1:2 |
| M | 2-amino-4-chlorophenol. | 2-naphthol-6-sulfonamide. | Cr | 1:2 |
| N | 2-amino-1-phenol-4-sulfonamide. | 8-acetamido-2-naphthol. | Cr | 1:2 |
| O | 1-amino-6-nitro-2-naphthol-4-sulfonic acid. | 2-naphthol | Cr | 1:2 |
| P | 2-amino-1-phenol-4-sulonamide. | 3-methyl-1-phenyl-5-pyrazolone. | Cr | 1:2 |
| Q | 2,5-dimethoxyaniline | 2-naphthol | Cr | 1:2 |

If desired, mixtures of these various dyes may be used to produce particular shades and the metallized complex dye may be used in admixture with the basic dyes which have been used heretofore in hectograph processes.

In order to be useful in hectograph duplication processes, the dye component of the novel compositions of this invention must be alcohol soluble. The order of solubility of the dye must be high enough to produce a legible stain in the copy operation. In general, any chromium or cobalt complex of an o,o'-dihydroxy azo dye which has a solubility of 5.0% by weight or greater in the alcohol solvent is operable. If desired, auxiliary solvents may be used to increase the rate and degree of solubility of the dye and thereby afford stronger copies.

In the novel compositions of this invention, the metal complex of the dye should comprise from about 5.0% to about 70% by weight of the composition.

As mentioned above, the carrier component of the dye compositions of the present invention may be an oil or a wax-oil combination. The wax-oil combinations are generally referred to as wax based carriers. The term "wax based" is well recognized in the art to distinguish this class of carriers for carbon paper inks over those carriers used for typewriter ribbon inks which are devoid of wax. As shown in Example 15, these latter inks are also used for hectograph printing. In the wax based carriers for carbon paper inks, the wax is present for the purpose of solidifying the hot film on the sheet after cooling to room temperature so the sheets will not stick during handling and storage. The presence of the oil is essential to impart the required flexibility and plasticity to the ink.

The carrier should comprise from about 30 to about 95% of the composition. These carriers are well-known in the art of hectograph duplication. Representative carriers which may be used include carnauba wax, beeswax, mineral oil, castor oil, lanolin, petrolatum, paraffin wax, lard oil, lecithin, cetyl alcohol or the like and the combinations of these waxes and oils.

In using the novel dye compositions of the present invention in hectograph duplicating processes, the composition is coated onto a paper to make a carbon sheet, followed by transfer to the master sheet and copies from this master sheet are then made by the spirit duplicating process. The duplicating fluids are the usual alcohol systems. These includes the lower alkanols (e.g. methanol, ethanol, etc.) and mixtures of these with glycols and glycol ethers such as 2-methoxyethanol. Usually the duplicating fluid is formulated to give solubility rates and evaporation rates convenient for the particular duplicating machine being used. Variations of these formulations are within the skill of the user.

The use of the novel dye compositions of the present invention for spirit hectograph printing represents a distinct advance in the art. Thus, these dye compositions permit the production of a multiplicity of good copies by the hectograph process and these copies exhibit superior light fastness. Also, due to their non-staining character, the carbon and master sheets may be readily handled without staining the skin. The dye compositions are readily prepared since the metallized complex dye is softer in texture than the basic dyes used heretofore and therefore less grinding time is required to give good dispersion in the vehicle. Good transfer of dye from master to copy sheet occurs giving a strong impression. Many of these metallized complex azo dyes have water solubility also, and these may be used in aqueous gelatin hectograph systems as well as the spirit soluble process described above.

The following examples will better illustrate the nature of the present invention; however, the invention is not intended to be limited to these examples. Parts are by weight unless otherwise indicated.

*Example 1*

56.6 parts of dye G of Table I
1.5 parts paraffin wax (M.P. 135–140° F.)
10.4 parts mineral oil (SAE #30)
19.0 parts petrolatum #5
12.5 parts carnauba wax crude 100.0 parts total The nondye ingredients (carrier) are weighed together and heated to 190° F. This temperature is maintained until the solid materials are in a homogeneous melt. The dye is then slowly added with good agitation while the temperature is held at 190° F.

The thin, uniform paste is poured onto a 3-roll ink mill having the grind rolls preheated to 190° F. and the ink puddled between these rolls for about 5 minutes. The scraper roll is set up at 100–110° F. to contact the grind rolls. The ink collects on the scraper trough as a flaked solid. This operation is repeated two times to complete the dispersion of the dye particles in the carrier.

The ink is remelted at 190° F. with good agitation and then run into the wells of a coating machine preheated to 190° F. The ink is coated on a carrier sheet and is solidified on the sheet by passing it over a chill roll at 100° F. The sheets are stored for several days to age them to allow the oil from the vehicle to penetrate deeper into the carrier sheet.

Impressions from the carbon sheet onto a master sheet are then made with a typewriter or other writing implement.

The master sheet is then mounted on the roll of a spirit hectograph duplicating machine using a duplicating fluid composed of 75 parts ethanol and 25 parts of 2-methoxyethanol. About 100 copies are obtained which possess excellent copy clarity, a uniform shade of blue print throughout the copy range and a medium to high copy strength.

The blue copy impressions from this dye composition have a great advantage over the prior art products in light-fastness. The impressions from the basic dyes of the prior art will be completely destroyed in 2 hours in the Fade-Ometer whereas the copies prepared as above withstand 90 hours with only a noticeable change and after 200 hours the copies are still legible.

*Example 2*

Example 1 is repeated except that the dye used is dye A of Table I.

Black copy impressions are produced which exhibit the same advantages pointed out in Example 1. The use of this dye shows a further advantage over the prior art dyes in that it is a self-shade black (i.e. single component) which gives a uniform shade throughout the entire copy range. The prior art hectograph blacks which are mixtures composed of several dye components of different shades do not give uniform shades, and suffer in light fastness.

*Examples 3 to 14*

The following table illustrates use of other chromium and cobalt complexes of o,o'-dihydroxy azo dyes to make hectograph compositions which give copy sheets exhibiting excellent light fastness. In each case, the details of Example 1 are to be followed except as noted.

What is claimed is:

1. A dye composition for hectographic duplication comprising (1) from about 30 to about 95% by weight of a carrier selected from the group consisting of a wax-oil combination and an oil, and (2) from about 70 to about 5% by weight of an alcohol soluble dye, said dye being a metal complex of an o,o'-dihydroxy azo dye wherein the metal is selected from the group consisting of chromium and cobalt, said o,o'-dihydroxy azo dye having the formula

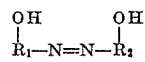

wherein $R_1$ is an aromatic radical selected from the group consisting of the benzene and naphthalene series and $R_2$ is a radical of a coupling component selected from the group consisting of the benzene, naphthalene, heterocyclic, and acetoacetarylide series.

2. A dye composition for hectographic duplication comprising 40 to 50% by weight of a wax-oil carrier and 60 to 50% by weight of a 1:1 chromium complex of the o,o'-dihydroxy azo dye obtained by coupling 1-naphthol-8-sulfonic acid with the diazo of 1-amino-2-naphthol-4-sulfonic acid.

TABLE II

| Ex. No. | Dye of Table I | Carrier | Duplicating fluid | Copy color |
|---|---|---|---|---|
| 3 | E | Ex. 1 | Ex. 1 | Violet. |
| 4 | F, 90 parts; D, 10 parts | Ex. 1 | Ex. 1 | Scarlet. |
| 5 | K | Ex. 1 | Ex. 1 | Red. |
| 6 | G | Ex. 1, but with 10 parts of petrolatum replaced with 10 parts of castor oil. | Ex. 1 | Blue. |
| 7 | G | Ex. 1, but replace 2 parts of carnauba wax with 2 parts of cetyl alcohol. | | Do. |
| 8 | H | Ex. 1 | 37.5 parts ethanol, 37.5 parts methanol, 25 parts 2-methoxy-ethanol. | Yellow. |
| 9 | I | Ex. 1 | Ex. 1 | Do. |
| 10 | J | Ex. 1 | Ex. 1 | Brown. |
| 11 | L | Ex. 1 | Ex. 1 | Red. |
| 12 | M | Ex. 1 | Ex. 1 | Violet. |
| 13 | N | Ex. 1 | Ex. 1 | Black. |
| 14 | P | Ex. 1 | Ex. 1 | Orange. |

*Example 15*

41.7 parts of the dye G of Table I
58.3 parts mineral oil (SAE #30)
_____
100.0 parts The oil is weighed into a mixing vessel and at 75° F. the dye added with good agitation to form a thick fluid paste.

Said paste is run through a three-roll ink mill and the operation repeated four times to complete the dispersion of the dye in the vehicle.

The ink thus obtained is impregnated into a ribbon and squeezed on pressure rolls to a semi-dry state.

The typewriter ribbon thus prepared is used to make master sheets which give blue copy. These copy sheets exhibit exceptional fastness to light, retaining legibility after 200 hours in the Fade-Ometer.

This application is a continuation-in-part of my copending application Serial No. 803,102, filed March 31, 1959, now abandoned.

As many widely different embodiments of this invention may be made without departing from the spirit and scope thereof, it is to be understood that this invention is not limited to the specific embodiments thereof except as defined in the appended claims.

3. A dye composition for hectographic duplication comprising 40 to 50% by weight of a wax-oil carrier and 60 to 50% by weight of a 1:1.5 chromium complex of the o,o'-dihydroxy azo dye obtained by coupling 2-naphthol with the diazo of 1-amino-6-nitro-2-naphthol-4-sulfonic acid.

4. In the process of hectograph duplication with spirit soluble dyes, the improvement comprising using the dye composition of claim 1.

5. A hectograph carbon sheet containing the dye composition of claim 1 wherein the carrier is a wax-oil combination.

6. A hectograph ribbon containing the dye composition of claim 1 wherein the carrier is an oil.

References Cited in the file of this patent
UNITED STATES PATENTS

| 2,165,034 | Daudt et al. | July 4, 1939 |
| 2,621,184 | Locke | Dec. 9, 1952 |
| 2,691,595 | Drautz | Oct. 12, 1954 |
| 2,966,419 | Anderson | Dec. 27, 1960 |

OTHER REFERENCES

Lubs: "Chemistry of Synthetic Dyes and Pigments," pub. New York, N.Y., 1955, by Reinhold, pages 177–8 and 163–4.